July 29, 1941.    T. BACKUS    2,250,820
REMOTE CONTROL FOR TRANSMISSIONS
Filed Dec. 17, 1938    3 Sheets-Sheet 1
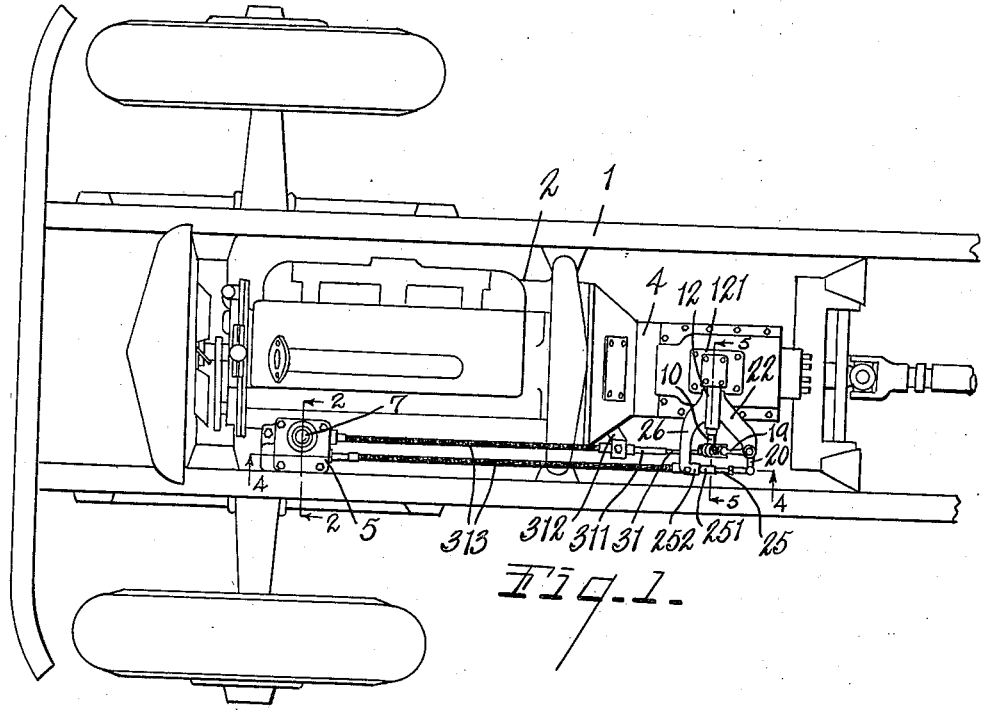
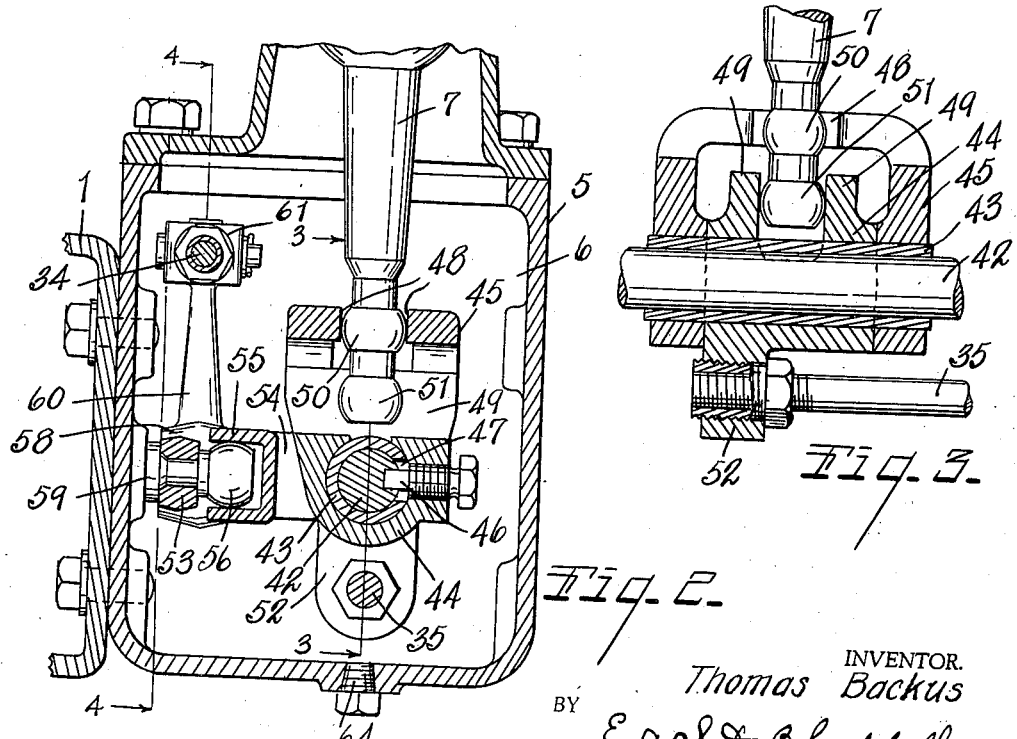
INVENTOR.
Thomas Backus
BY Earl & Chappell
ATTORNEYS

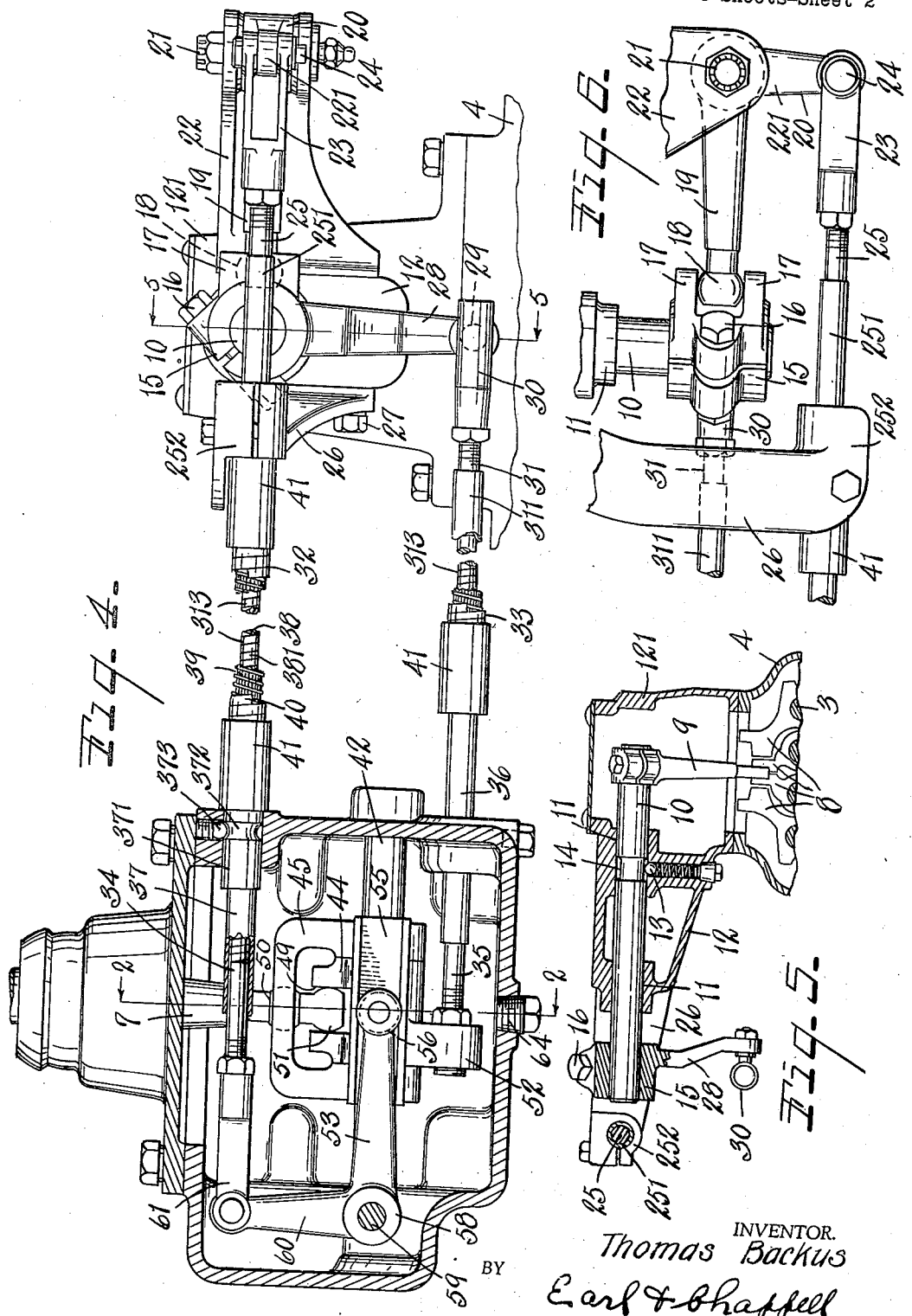

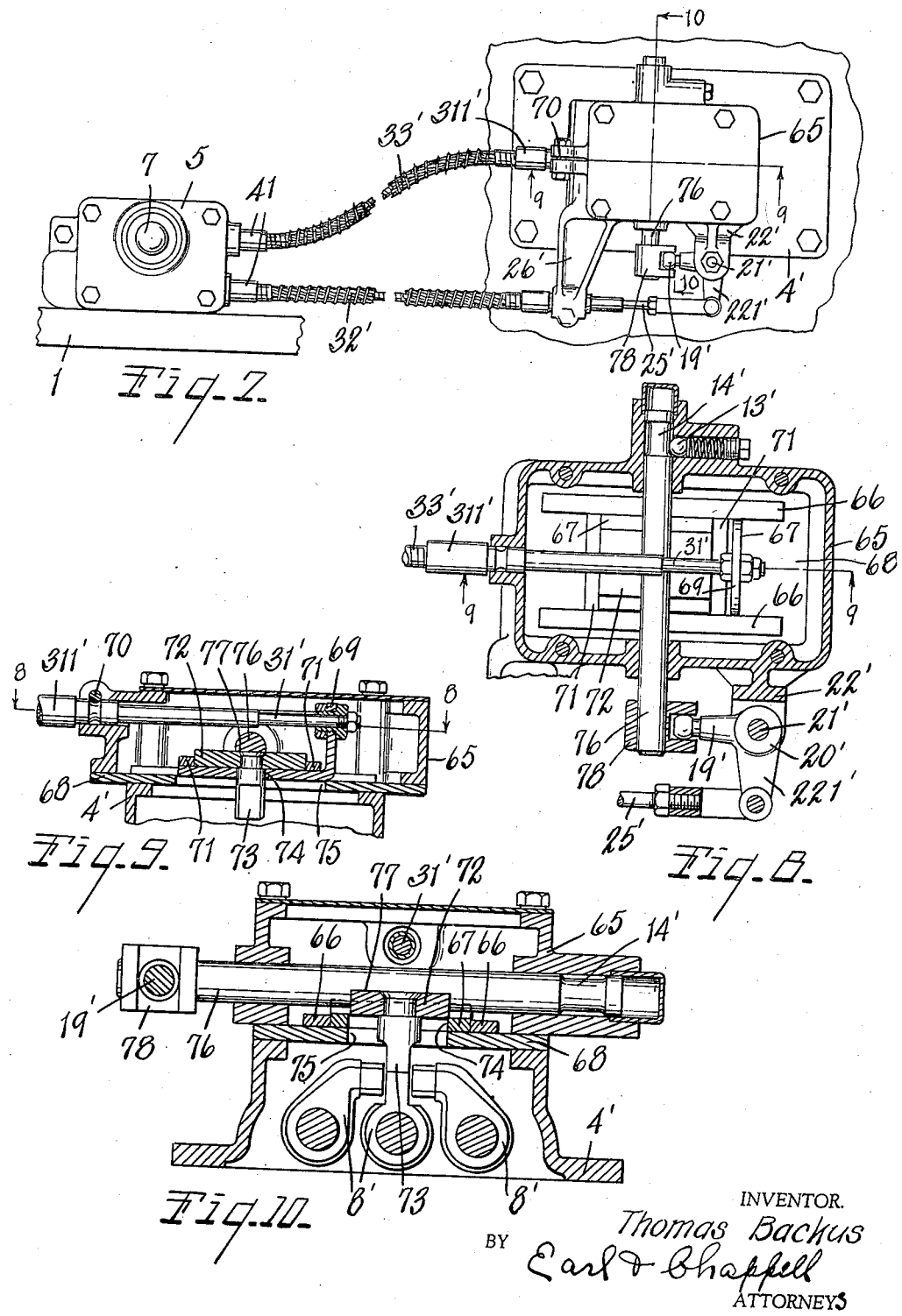

Patented July 29, 1941

2,250,820

UNITED STATES PATENT OFFICE 2,250,820

REMOTE CONTROL FOR TRANSMISSIONS

Thomas Backus, Kalamazoo, Mich., assignor to Fuller Manufacturing Company, Kalamazoo, Mich.

Application December 17, 1938, Serial No. 246,295

17 Claims. (Cl. 74—473)

This invention relates to improvements in remote controls for transmissions.

The main objects of my invention are:

First, to provide a remote control for vehicle transmissions, particularly for trucks, buses, and other large motor driven vehicles.

Second, to provide a remote control of the type described which permits positioning of the driver's seat or cab in any desired position relative to the engine in order to economize on space and yet provides an effective transmission gear shift action.

Third, to provide a remote control of the type described wherein the manual selector mechanism may be mounted in any desired position with reference to the vehicle frame, engine, or transmission and which is proof against damage or becoming inoperative due to twisting or misalinement of the frame.

Fourth, to provide a remote control of the type described having a minimum of mechanical movements tending to create excessive lost motion and thereby detract from effective shifting of the gears by the operator.

Fifth, to provide a novel remote control utilizing flexible push-pull cables to secure the above noted advantages.

Sixth, to provide a remote control for a transmission having provisions for minimizing the space occupied thereby.

Seventh, to provide a remote control which is proof against damage due to twisting or misalinement of the frame by reason of the use of flexible push-pull actuating elements and which, furthermore, facilitates shifting of the gears.

Further objects relating to details and economies of my invention will definitely appear from the description to follow. The invention is defined in the claims.

A structure embodying the features of my invention is illustrated in the accompanying drawings, wherein:

Fig. 1 is a fragmentary top plan view illustrating conventionally the engine and frame of a motor vehicle with my novel remote control for the transmission thereof operatively associated therewith.

Fig. 2 is an enlarged fragmentary view in vertical section on line 2—2 of Figs. 1 and 4.

Fig. 3 is an enlarged fragmentary view in section on line 3—3 of Fig. 2, illustrating particulars of construction of the gear selector and gear shift yoke constituting a part of my control.

Fig. 4 is an enlarged fragmentary view in section on line 4—4 of Figs. 1 and 2, illustrating the remote control assembly of my invention in operative relation to the cab gear shift lever and the usual transmission housing.

Fig. 5 is a fragmentary view in section on line 5—5 of Figs. 1 and 4, illustrating details of my remote control as it is operatively related to the transmission of the vehicle.

Fig. 6 is a fragmentary top plan view illustrating particularly the laterally movable gear selector and shifting instrumentalities forming a part of my remote control.

Fig. 7 is a fragmentary top plan view illustrating a modified embodiment or adaptation of the remote control of my invention.

Fig. 8 is a fragmentary view in horizontal section on line 8—8 of Fig. 9, illustrating details of the remote control and transmission of Fig. 7.

Fig. 9 is a fragmentary view in section on line 9—9 of Figs. 7 and 8.

Fig. 10 is a view in vertical transverse section on line 10—10 of Fig. 7.

In present day constructions of vehicles such as trucks, buses, and the like, particularly those powered by internal combustion engines, the tendency is, for the purpose of economizing on space, to mount the driver's seat or cab as near the front of the vehicle as possible and in many instances the seat or cab is arranged directly over the engine. In others, particularly certain types of motor buses, the engine is at the rear of the vehicle. This obviously necessitates the arrangement of the gear shift control lever adjacent the driver's seat without regard to placement of the engine. Since the transmission housing is adjacent the engine, some remote control device is called for to effect the transmission gear shift operation.

Hitherto proposed devices for this purpose have been characterized by certain definite defects. For example, remote controls at present on the market are subject to being damaged or rendered inoperative by twists or misalinement of the frame resulting from collisions, etc., due to the fact that they rely for their operation on assemblages of rigid links and levers. Moreover, it is a fact that in remote controls now on the market, embodying a large number of pivoted parts, such as levers, links, rods, and the like, the lost motion arising in the various connections, pivotal and otherwise, is cumulative with the result that an operator can no longer rely on his sense of touch in detecting engine vibration through the remote control system to inform him when the main drive gear has come to an appropriate speed so that the transmission gear ratio may be changed. This results in frequent gear clashing and accompanying strain if not definite breakage of the transmission. Types of remote controls embodying other than mechanical connections, such as pneumatic or hydraulic arrangements, are open to the same objection referred to above; namely, the operator has no means for ascertaining by means of transmitted vibration when the gears may be shifted.

The present control is particularly devised to eliminate all of the aforesaid objections in that it embodies a flexible or bendable push-pull cable to constitute the connection between a gear shift lever and associated selector housing, wherever they are disposed, and the rearwardly or otherwise disposed transmission, thereby enabling the control lever and the transmission to be arranged in any desired position relative to one another and the engine frame unaffected by changes in this relation arising from twisting of the frame. Likewise, the operator is afforded a more direct signal from the transmission through his sense of touch as to the proper time for shifting.

Referring to the drawings, the reference numeral 1 indicates in general a conventional bus or truck frame. In the selected case, a left hand steered vehicle is shown, but it will be apparent that my control is equally adaptable for a right hand steered vehicle. The reference numeral 2 designates the vehicle engine which in this embodiment is at the forward end of the vehicle and is connected to a conventional transmission generally designated 3 in the transmission housing 4 to the rear of the engine.

In the present day, it is general practice to install the driver's seat or cab directly above and to the front of the engine in a front engine powered vehicle in order to effect economy of space, in view of the fact that many states have enacted laws limiting the over-all length of commercial vehicles or trucks. Accordingly, in order to enable the truck to carry maximum load, the cabs thereof have been positioned as described, thus enabling the space formerly occupied thereby to be converted into load space. The reference numeral 5 accordingly designates a control housing containing certain actuating elements of my remote control device to be described, which housing is generally indicated by the reference numeral 6. Housing 5 is situated at the left front end of engine 2 and above the same, whereby the gear selector and actuating control lever 7 projects upwardly into the operator's cab or compartment. The relative arrangement of the vehicle frame, engine, control housing, and transmission housing is clearly illustrated in Fig. 1.

Referring to Fig. 5, the transmission 3 includes a plurality of gear shaft forks or yokes 8 which are adapted to be actuated axially to effect change in the transmission gear ratio by means of a depending arm 9 secured to a shifting shaft 10. This shaft is rotatably journaled in bearings 11 provided in an extension 12 of an auxiliary transmission housing 121 and is likewise axially slidable in the said bearings whereby to effect a transverse positioning movement of arm 9 relative to the shifter yokes 8, or for pivoted movement of the arm to engage and actuate a selected shifter yoke, as will be apparent. A spring urged ball detent position finder 13 engages in an elongated annular groove 14 on the shifting shaft 10. Sufficient radial pressure is exerted on the shaft by this detent at the groove of the shaft to enable the shifter arm 9 to be located or lined up with reference to either of the two intermediate yokes 8. To line the same up with either of the outside yokes 8, a slight pressure must be exerted to depress detent 13 and permit movement of the shifting shaft 10 to either extreme sidewise position.

It is with improved instrumentalities for effecting the aforesaid selective lateral or rotational movements of shaft 10 that my invention is mainly concerned. These instrumentalities will now be described.

Referring to Figs. 4 and 6, the shifting shaft 10 has on the outermost end thereof a split clamping collar 15 secured thereto by the bolt 16, which collar has a pair of radial ears 17 constituting a yoke engaged by the ball end 18 of one arm 19 of a bell crank lever 20. This lever is journaled at 21 in a bracket 22 extending from and bolted to the housing or its extension 12. The other bell crank arm 221 is pivotally connected to a fork 23 by a pin 24, the fork being adjustably secured to a rod-like actuating element 25 of a push-pull cable to be hereinafter described.

The aforesaid actuating rod 25 constitutes a stiff guide extension of the flexible actuating element to be described. The rod is guided for reciprocation in an elongated tube 251 clamped in a split boss 252 on a fixed bracket 26 which, like bracket 22, is bolted to the shifter shaft housing 12. Reciprocating movement imparted to rod 25 in a manner to be described results in oscillating movement of bell crank lever 20 and axial translation of the shifter shaft 10 to thereby selectively position actuating or shifter arm 9 as described above.

The shifter arm 9 is oscillated to shift a selected yoke 8 by oscillation of shaft 10 through a depending arm 28 integral with split collar 15. Arm 28 has a lateral projection or lug 29 engageable with a connector ball joint 30 adjustably secured to a second reciprocating rod 31. This rod, like rod 25, also constitutes an extension of a push-pull cable element to be hereinafter described, and it is slidably guided for reciprocation in an elongated tube 311 suitably clamped to a fixed bracket 312, see Fig. 1.

Obviously, movement of the rod 31 in either direction results in oscillation of arm 28 and shaft 10, which in turn effects gear shifting movement of the shifter arm 9 as described.

The axially reciprocable rods 25, 31 are connected to the mechanisms in the forwardly disposed control housing 5 by means of the flexible tension and thrust transmitting elements 313 of a position selector cable 32 and a gear shifting cable 33, respectively.

The aforesaid flexible elements 313 connect rods 25, 31, respectively, with similar rods 34, 35 leading into housing 5 through fixed guide tubes 36, 37 attached to that housing in any suitable manner. For example, the tubes may, if desired, be enlarged at 371 and annularly grooved at 372 to receive a ball detent 373 urged into place by a plug threaded into the housing. Such an expedient enables the tube to be effectively held against end movement without distorting the same so as to bind the rod therein.

The cables 32, 33, which per se form no part of my invention, are of the type generally known as Bowden connectors, being particularly devised for the transmission of substantial tension and thrust. The elements thereof are not shown with special particularity, but in general they consist of a plurality of longitudinal central wires 38 bound spirally by further wires 381. The thus associated longitudinal and spiral wires 38, 381 constitute the flexible and shiftable push-pull elements designated 313. They are encased in flexible reinforced sheaths 39, which in turn may be encased in further sheaths 40 of coiled wire. The flexible cables are completed by enlarged abutments 41, which may be positioned against the respective clamping points for the cable.

Although, as stated, the specific construction of the flexible push-pull transmission cables is not a part of my invention, I consider that the assembly of flexible push-pull means of this type with the gear shift positioning and actuating instrumentalities above described, and with the further selector and actuating provisions to be described, is novel and inventive with me and of considerable practical value by reason of the advantages which characterize the same, as referred to above.

I will now describe the instrumentalities whereby the positioning or selector cable 32 and the gear shift actuating cable 33 are actuated to effect selective actuation axially and rotatively respectively of the gear shifting shaft 10. Referring to Figs. 2, 3, and 4, the reference numeral 42 indicates a shaft which is suitably fixed in the control housing 5, extending in a front-to-rear direction therein. This shaft carries a bushing 43 on which are mounted internal and external yoke members 44, 45, respectively. The yoke member 44 has a pin or key 46 threaded therein and slidable in a key way in shaft 42, the bushing 43 having an opening 47 therein to accommodate the key.

The yoke member 45 is intended to move both axially of and rotatably on shaft 42 under the influence of shift lever 7, while yoke member 44 moves only axially on the shaft. The respective yoke members are therefore provided with pairs of tappets or lugs 48, 49 at right angles to one another which, as clearly illustrated in Figs. 2 and 3, coact respectively with the ball shifter portions 50, 51 on the lowermost end of shift control lever 7.

The yoke member 44 has formed integral therewith a depending ear 52 adapted to threadedly and adjustably receive the rod 35 connected to the push-pull cable 33, whereby movement of the ear axially of shaft 42 oscillates depending arm 28 to effect gear shift actuation as described above. The yoke member 45, which is adapted to be oscillated by the gear shift lever 7, has connected thereto integrally or otherwise an offset arm 54 carrying an elongated channeled crank element 55 which receives a ball connector lug 56 on one arm 53 of a bell crank lever 58 which is journaled in the housing 5 at 59. The other arm 60 of this bell crank lever is pivoted to connector 61 adjustably secured to the sliding rod 34, whereby connection is made through the position selector cable 32 to the shifting shaft 10 to shift the latter axially. The elongated channel 55, in addition to serving as an actuator for the bell crank 60, permits movement of the yoke members 44, 45 axially of shaft 42 in a manner which will be apparent.

A conventional lubricant drainage plug is designated by the reference numeral 64.

From the foregoing, it is believed that the operation of my remote control will be apparent. The shifting of the gear shift arm 9 either rotatably or laterally is effected quickly and easily without lost motion such as is frequently attributable to the multiplicity of pivoted mechanical linkages characterizing hitherto known devices. The flexible position selector and gear shift actuating cables make possible the positioning of the control and transmission housings in any desired relation to one another. They enable the control housing in particular to be positioned wherever desired relative to the vehicle frame and render the system impervious to twisting and misalinement of the latter. Moreover, drivers or operators favor such a control since it enables them to feel the engine vibrations as transmitted with small lost motion through the flexible cables and thereby ascertain the best time to shift gears. Notwithstanding the above advantages, the assembly is relatively simple and economical in its parts.

In Figs. 7, 8, 9, and 10, I illustrate a modified embodiment or adaptation of my remote control as applied to a transmission, which embodiment is particularly designed to effect economy of vertical space. In certain installations, the exigencies of space due to one factor or another require the cutting down to a minimum of the vertical dimension of the transmission housing and parts associated therewith, and to this end I illustrate my remote control as connected to a gear selector and shifting arrangement of the sliding plate type.

Referring to Figs. 7 to 10, inclusive (wherein parts similar to those already described are designated by the same reference numerals primed), the reference numeral 65 designates an auxiliary housing mounted on the transmission housing 4' in any suitable manner. This auxiliary housing has the longitudinally disposed parallel tracks or ways 66 secured thereto, between which a longitudinally movable gear shifting plate 67 is disposed for longitudinal sliding movement along the floor 68 of housing 65. The aforesaid plate has an upturned lug 69 which is suitably connected to the longitudinal sliding rod 31' forming a part of the flexible gear shift cable 33', the fixed element 311' of the aforesaid cable being secured to the housing 65 at 70.

The longitudinally slidable gear shift plate 67 itself carries a pair of laterally disposed parallel tracks or ways 71 between which a gear selector plate 72 is disposed for lateral sliding movement on the plate 67. Selector plate 72 has a lug 73 thereon depending through an elongated opening 74 in the shifting plate 67 whereby to engage the gear shift members 8', the elongated opening 74 permitting lateral selecting or positioning movement of lug 73. Shifting plate 67 of course carries selector plate 72 and the lug 73 longitudinally for shifting movement of the lug once it has been appropriately positioned. The floor of housing 65 has an opening 75 therein accommodating lug 73 in these movements. Of course, the number of gear shift members 8' may be greater than the three which are illustrated in Fig. 10.

In order to effect lateral shifting of selector plate 72 while permitting longitudinal movement thereof by the shifter plate, I provide the movable shaft or rod 76 which is mounted for axial movement in the housing 65, extending thereacross at right angles to the direction of movement of plate 67. Rod 76 has a rectangular recess 77 formed therein, this recess being equal in width to the width of selector plate 72 and receiving the same in the manner illustrated in Fig. 10. Accordingly, axial movement of rod or shaft 76 transversely of housing 65 results in lateral selecting movement of plate 72 and lug 73 on the shifting plate 67. When the shifting plate 67 is actuated longitudinally, the selector plate 72 is carried therewith without resistance on the part of rod 76, the said plate 72 sliding longitudinally in the groove or recess 77.

Rod 76 carries a collar or yoke 78 exteriorly of housing 65, which yoke is engaged by one arm 19' of a bell crank lever 20' journaled at 21' in a bracket 22' secured to housing 65. The other bell crank arm 221' is pivotally connected to the slidable rod-like actuating or gear selector element 25' constituting a part of the selector cable 32', the stationary part or guide of which is clamped in a bracket 26' on the housing. It will be appreciated that pivotal movement of bell crank 20' results in axial selecting movement of rod or shaft 76.

Cables 32', 33' are connected to a selector and shifting mechanism within the control housing similar to that described above.

To enable the operator to ascertain the location of the selector lug 73, the resilient ball detent 13' and coacting groove 14' in rod 76 may be provided, these elements in this case being located on the opposite side of housing 65 from collar or yoke 78.

The above described embodiment of my invention is characterized mainly by the distinct economy of space which it effects, notwithstanding the ease of shifting gears which is made possible by the independent shifting and selector constructions. The flexible cable connectors enable the selecting and shifting manipulations to be easily performed, notwithstanding misalinement or out-of-alinement of the transmission and control housings, as is clearly illustrated in Fig. 7. It will be understood that the embodiment illustrated in Figs. 1 to 6, inclusive, is likewise characterized by this advantage, notwithstanding the fact that the cables 32, 33 have been illustrated in what is of course the preferred straight-line disposition thereof.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A remote control for transmissions, comprising a control housing adapted to be mounted on a vehicle frame in substantially spaced relation to the transmission of the vehicle, a gear selector positioning and shifting shaft mounted adjacent said transmission and having a shifting member thereon adapted to shift the transmission gears, and means for rotating and axially shifting said shaft from said control housing, comprising a pair of flexible push-pull cables each having a thrust and tension transmitting element, means for connecting one of said elements to said shaft to rotate the same, means for connecting the other element to the shaft to axially shift the same, said elements extending from said connecting means to said control housing, and means in said control housing for selectively shifting said elements to effect the aforesaid movements of said shaft, comprising a shaft, a yoke slidable on said shaft, said yoke having an extension thereon connected to one of said elements, a further yoke rotatable and slidable on the shaft, a bell crank pivoted in the housing, said further yoke having a channeled arm engaging one arm of said bell crank, the other arm of said bell crank being pivotally connected to said other element, and manually operable means for selectively actuating said yokes.

2. A remote control for transmissions, comprising a control housing adapted to be mounted on a vehicle frame in substantially spaced relation to the transmission of the vehicle, a gear selector positioning and shifting shaft mounted adjacent said transmission and having a shifting member thereon adapted to shift the transmission gears, and means for rotating and axially shifting said shaft from said control housing comprising a pair of flexible push-pull cables each having a thrust and tension transmitting element, means for connecting one of said elements to said shaft to rotate the same, means for connecting the other element to the shaft to axially shift the same, said elements extending from said connecting means to said control housing, and means in said control housing for selectively shifting said elements to effect the aforesaid movements of said shaft, comprising a yoke, means for slidably mounting said yoke in the housing, said yoke being connected to one of said elements, a further yoke rotatably mounted in the housing, a bell crank pivoted in the housing, said further yoke having a channeled arm engaging one arm of said bell crank, the other arm of said bell crank being pivotally connected to said other element, and manually operable means for selectively actuating said yokes.

3. A remote control for transmissions, comprising a control housing adapted to be mounted on a vehicle frame in substantially spaced relation to the transmission of the vehicle, a gear selector positioning and shifting shaft mounted adjacent said transmission and having a shifting member thereon adapted to shift the transmission gears, and means for rotating and axially shifting said shaft from said control housing comprising a pair of flexible push-pull cables each having a thrust and tension transmitting element, means for connecting one of said elements to said shaft to rotate the same, means for connecting the other element to the shaft to axially shift the same, said elements extending from said connecting means to said control housing, and means in said control housing for selectively shifting said elements to effect the aforesaid movements of said shaft, comprising a yoke, means for slidably mounting said yoke in the housing, said yoke being connected to one of said elements, a further yoke rotatably mounted in the housing, means for connecting said further yoke to said other element, and manually operable means for selectively actuating said yokes.

4. A remote control for transmissions, comprising a control housing adapted to be mounted on a vehicle frame in substantially spaced relation to the transmission of the vehicle, a gear selector positioning and shifting shaft mounted adjacent said transmission and having a shifting member thereon adapted to shift the transmission gears, and means for rotating and axially shifting said shaft from said control housing comprising a pair of flexible push-pull cables each having a thrust and tension transmitting element, means for connecting one of said elements to said shaft to rotate the same, means for connecting the other element to the shaft to axially shift the same, said elements extending from said connecting means to said control housing, and means in said control housing for selectively shifting said elements to effect the aforesaid movements of said shaft.

5. A remote control for engine transmissions, comprising a control housing adapted to be mounted in substantially spaced relation to the transmission, said transmission including a gear shifting member, and means for laterally and longitudinally shifting said member from said control housing, comprising a pair of flexible push-pull cables each having a thrust and tension transmitting element, means for connecting said elements to said member to effect lateral and longitudinal shifting thereof, said elements extending into said control housing, and means in said control housing for selectively sliding said elements, comprising a shaft, a yoke slidable on said shaft, said yoke being connected to one of said elements, a further yoke rotatable and slidable on the shaft, a bell crank pivoted in the housing, said further yoke having a channeled arm engaging one arm of said bell crank, the other arm of said bell crank being pivotally connected to said other element, and a manually operable selector lever engaging said yokes to actuate the same.

6. A remote control for engine transmissions, comprising a control housing adapted to be mounted in substantially spaced relation to the transmission, said transmission including a gear shifting member, and means for laterally and longitudinally shifting said member from said control housing, comprising a pair of flexible push-pull cables each having a thrust and tension transmitting element, means for connecting said elements to said member to effect lateral and longitudinal shifting thereof, said elements extending into said control housing, and means in said control housing for selectively sliding said elements comprising a shaft, a yoke slidable on said shaft, said yoke being connected to one of said elements, a further yoke rotatable and slidable on the shaft, a bell crank pivoted in the housing, means for oscillating said bell crank from said further yoke, an arm of said bell crank being pivotally connected to said other element, and a manually operable selector lever engaging said yokes to actuate the same.

7. A remote control for engine transmissions, comprising a control housing adapted to be mounted in substantially spaced relation to the transmission, said transmission including a gear shifting member, and means for laterally and longitudinally shifting said member from said control housing, comprising a pair of flexible push-pull cables each having a thrust and tension transmitting element, means for connecting said elements to said member to effect lateral and longitudinal shifting thereof, said elements extending into said control housing, and means in said control housing for selectively sliding said elements.

8. A remote control for an engine driven vehicle transmission, comprising a control housing mounted adjacent and above the engine of the vehicle, and an auxiliary housing associated with the transmission housing of the vehicle, a rotatable and axially shiftable shaft in said auxiliary housing having a gear shift member secured thereto, an arm and a yoke connected to said shaft for selectively rotating and shifting the shaft axially, and means for actuating said arm and yoke, comprising a bell crank having an arm engaging said yoke, said bell crank being pivotally mounted on said auxiliary housing, a pair of flexible push-pull cables, means connecting said cables respectively to said first named arm and to the other arm of said bell crank lever for oscillating the first named arm and laterally shifting the yoke, said cables having thrust and tension transmitting elements slidably mounted in said control housing, and means in said control housing for selectively actuating said elements, comprising a pair of yokes, a shaft on which said last named yokes are rotatably and slidably mounted at 90° to one another, a selector lever having portions movable laterally and longitudinally relative to said last named yokes to actuate the same longitudinally and angularly respectively with reference to the axis of said shaft, and means for connecting said last named yokes to said slidably mounted elements for actuation of the latter in accordance with the aforesaid movements of the former.

9. A remote control for an engine driven vehicle transmission, comprising a control housing mounted adjacent and above the engine of the vehicle, and an auxiliary housing associated with the tranmission housing of the vehicle, a rotatable and axially shiftable shaft in said auxiliary housing having a gear shift member secured thereto, an arm and a yoke connected to said shaft for selectively rotating and shifting the shaft axially, and means for actuating said arm and yoke, comprising a bell crank having an arm engaging said yoke, said bell crank being pivotally mounted on said auxiliary housing, a pair of flexible push-pull cables, means connecting said cables respectively to said first named arm and to the other arm of said bell crank lever for oscillating the first named arm and laterally shifting the yoke, said cables having thrust and tension transmitting elements slidably mounted in said control housing, and means in said control housing for selectively actuating said elements.

10. A remote control for a transmission, comprising a control housing and a further housing associated with the transmission, a gear shift shaft rotatable and laterally shiftable in said further housing and having a gear shift member thereon, an arm connected to said shaft for rotating the latter, and a yoke connected to said shaft for shifting the latter axially, and means for actuating said arm and yoke, comprising a pair of flexible push-pull cables, connections between said cables and said arm and yoke respectively for oscillating the former and laterally shifting the latter, said cables having thrust and tension transmitting elements slidably mounted in said control housing, and means in said control housing for actuating said elements.

11. In a remote control for transmissions, a housing, a gear selector and shifter element mounted in said housing for lateral and longitudinal selecting and shifting movements, a control housing remote from said first named housing, and means for actuating said element laterally and longitudinally from said control housing, comprising a pair of elongated thrust and tension transmitting members extending between said housings, means for connecting one end of each of said members to said selector and shifter element, a pair of yokes, means for mounting said yokes in said control housing for rotating and sliding movement respectively, means for connecting the slidably mounted yoke to one of the thrust and tension transmitting members, means for connecting the rotatably mounted yoke to the other member, comprising a crank arm connected to the rotatable yoke and a bell crank pivoted in the control housing and having the arms thereof respectively engaging and actuated by the crank arm and engaging and actuating said other thrust and tension transmitting member, and means in said control housing for selectively actuating said yokes for sliding and rotating movement respectively.

12. In a remote control for transmissions, a housing, a gear selector and shifter element mounted in said housing for lateral and longitudinal selecting and shifting movements, a control housing, and means for actuating said element laterally and longitudinally from said control housing, comprising a pair of elongated thrust and tension transmitting members extending between said housings, means for connecting said members to said selector and shifter element, a pair of yokes, means for mounting said yokes in said control housing for rotating and sliding movement respectively, means for connecting the slidably mounted yoke to one of the thrust and tension transmitting members, means for connecting the rotatably mounted yoke to the other member, and means in said control housing for selectively actuating said yokes for sliding and rotating movement respectively.

13. In a remote control for transmissions, a housing, a plurality of gear shift members therein, laterally and longitudinally movable selecting and shifting means for said members, a control housing remote from said first named housing, and means for actuating said element laterally and longitudinally from said control housing, comprising a pair of thrust and tension transmitting members extending between said housings, means for connecting one end of each of said members to said first named means, a pair of yokes, means for mounting said yokes in said control housing for rotating and sliding movement respectively, means for connecting the slidably mounted yoke to one of the thrust and tension transmitting members, means for connecting the rotatably mounted yoke to the other member, comprising a crank arm connected to the rotatable yoke and a bell crank pivoted in the control housing and having the arms thereof respectively engaging and actuated by the crank arm and engaging and actuating said other thrust and tension transmitting member, and means for selectively actuating said yokes for sliding and rotating movement respectively.

14. In a remote control for transmissions, a housing, a plurality of gear shift members therein, laterally and longitudinally movable selecting and shifting means for said members in said housing, a control housing remote from said first named housing, and means for actuating said element laterally and longitudinally from said control housing, comprising a pair of thrust and tension transmitting members extending between said housings, means for connecting one end of each of said members to said first named means, a pair of yokes, means for mounting said yokes in said control housing for rotating and sliding movement respectively, means for connecting the slidably mounted yoke to one of the thrust and tension transmitting members, means for connecting the rotatably mounted yoke to the other member, and means for selectively actuating said yokes for sliding and rotating movement respectively.

15. A transmission control comprising a longitudinally slidable gear shift member, a gear selector member carried by said gear shift member for lateral sliding movement thereon and for longitudinal movement therewith, a housing for said members including means for mounting said gear shift member for longitudinal sliding movement, said selector member having a lug thereon adapted to be selectively positioned by said lateral movement of the selector member and operative to effect a gear shifting operation upon longitudinal movement of the members, a control housing remote from the first named housing and having a selecting and shifting control mechanism therein, and independent means connected to said members and control mechanism for actuating said members from said mechanism, comprising separate flexible thrust and tension transmitting cables connected at one end to said mechanism and means for connecting said cables at the other end to said respective selector and shifting members whereby to effect selective longitudinal and lateral movements thereof as described.

16. A transmission control comprising a longitudinally slidable gear shift member, a gear selector member carried by said gear shift member for lateral sliding movement thereon and for longitudinal movement therewith, a housing for said members including means for mounting said gear shift member for longitudinal sliding movement, said selector member having a lug thereon adapted to be selectively positioned by said lateral movement of the selector member and operative to effect a gear shifting operation upon longitudinal movement of the members, a control housing remote from the first named housing and having a selecting and shifting control mechanism therein, and independent means connected to said members and control mechanism for actuating said members from said mechanism.

17. In a remote control for transmissions having a gear enclosing housing, a gear selector and shifter member mounted for laterally slidable selecting movement in said housing to selectively position said member relative to a plurality of gear shifting elements disposed transversely in the housing, and means for positively shifting said member in both directions of its lateral sliding movement, comprising a bell crank pivotally mounted on the exterior of said housing and having one of the arms thereof positively engaging said member, a control housing remote from said gear enclosing housing, a control mechanism associated with said control housing, and means for connecting said mechanism with the other arm of said bell crank for positive actuation of the latter in both pivotal directions, comprising a flexible thrust and tension transmitting cable connected at one end to said other arm, and means operatively connecting its other end to said mechanism for actuation thereby.

THOMAS BACKUS.